(12) United States Patent
Lee et al.

(10) Patent No.: US 12,188,285 B2
(45) Date of Patent: Jan. 7, 2025

(54) DOOR HINGE DEVICE FOR VEHICLE

(71) Applicants: Hyundai Motor Company, Seoul (KR); Kia Corporation, Seoul (KR)

(72) Inventors: Jaeseung Lee, Hwaseong-Si (KR); Chungsik Yim, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/381,013

(22) Filed: Oct. 17, 2023

(65) Prior Publication Data
US 2024/0247532 A1 Jul. 25, 2024

(30) Foreign Application Priority Data

Jan. 20, 2023 (KR) .......................... 10-2023-0009001

(51) Int. Cl.
*E05F 15/622* (2015.01)
*B60J 5/04* (2006.01)
*E05D 15/58* (2006.01)
*E05F 15/652* (2015.01)
*E05F 15/662* (2015.01)
*E05D 3/02* (2006.01)

(52) U.S. Cl.
CPC ............ *E05F 15/662* (2015.01); *B60J 5/048* (2013.01); *E05D 15/581* (2013.01); *E05F 15/652* (2015.01); *E05D 3/02* (2013.01); *E05Y 2201/10* (2013.01); *E05Y 2900/531* (2013.01)

(58) Field of Classification Search
CPC ..... E05F 15/662; E05F 15/652; E05F 15/622; E05F 15/673; E05F 15/649; E05F 15/655; E05D 15/581; E05D 2015/586; F16H 2025/2053
USPC .................................. 49/257, 260; 74/84.35
See application file for complete search history.

(56) References Cited

U.S. PATENT DOCUMENTS

| | | | |
|---|---|---|---|
| 8,220,349 B2 * | 7/2012 | Prichard | F16H 25/2056 74/89.35 |
| 8,596,153 B2 * | 12/2013 | Arenz | E05F 15/627 49/340 |
| 9,222,296 B2 * | 12/2015 | Hamminga | E05F 15/41 |

FOREIGN PATENT DOCUMENTS

KR 10-2019-0028966 A 3/2019

* cited by examiner

*Primary Examiner* — Marcus Menezes
(74) *Attorney, Agent, or Firm* — Morgan, Lewis & Bockius LLP

(57) ABSTRACT

A vehicle door hinge device may include a case set diagonally provided toward an outside of a vehicle body at a location of the vehicle body corresponding to an end portion of a door, and including a slide case slidable with respect to a main case, a sliding arm provided on the slide case, and pivotally connected to a door hinge bracket fixed to the end portion of the door in an outside of the slide case, and a driving unit including first and second screws that are motor-driven and disposed in an interior of the main case in a longitudinal direction of the main case to be coupled to the slide case and the sliding arm, respectively, and configured to simultaneously slide the slide case and the sliding arm with respect to the main case.

16 Claims, 11 Drawing Sheets

DOOR HINGE DEVICE FOR VEHICLE

CROSS-REFERENCE TO RELATED APPLICATION

The present application claims priority to Korean Patent Application No. 10-2023-0009001 filed on Jan. 20, 2023, the entire contents of which is incorporated herein for all purposes by this reference.

BACKGROUND OF THE PRESENT DISCLOSURE

Field of the Present Disclosure

The present disclosure relates to a vehicle door hinge device, and more particularly, the present disclosure relates to a vehicle door hinge device enabling independent opening and closing of respective doors by pushing a hinge portion of the door toward outside of the vehicle body without including a B-pillar.

Description of Related Art

In general, a vehicle door is a door that separates the inside and the outside of the vehicle. The vehicle door blocks external noise, rain, dust, wind, etc., and in case of a side surface collision, provides an important function of protecting the occupants by absorbing the impact together with the side structure to safely protect an occupant.

There are various types of vehicle doors, including special-purpose doors, but hinge-type swing doors are most commonly applied to passenger vehicles.

In general, a swing door refers to a door that opens toward the outside of the vehicle body around a hinge shaft provided between the door and the vehicle body through a hinge bracket, and has advantages of easy opening and closing and simple structure providing easy maintenance and repair.

On the other hand, some vehicles are applied with opposing swing doors, which have a large open feeling when the door is opened and is advantageous for occupants to get on or off the vehicle.

These opposing swing doors are divided into a type without a B-pillar and a type with a B-pillar.

FIG. 1 is a side view of a vehicle applied with opposing swing doors according to an example of the related art, and FIG. 2 is a cross-sectional view exemplarily illustrating a portion in which a front door and a rear door meet each other in the vehicle of FIG. 1.

First, referring to FIG. 1 and FIG. 2, an example of opposing swing doors applied to a vehicle 100 without a B-pillar is illustrated. A front door 110 has a hinge portion installed at the front end portion of the front door 110, and a rear door 120 has a hinge portion installed at the rear end portion of the rear door 120.

A latch portion LC for maintaining the locked state is installed on one side of the front door 110 or the rear door 120 in the opposing swing doors.

Furthermore, a sealing S for airtightness is installed between the rear end portion of the front door 110 and the front end portion of the rear door 120.

As described above, the opposing swing doors of the vehicle 100 without a B-pillar has good open feeling when the passengers get on/off or in leisure activities. However, there is a drawback that an opening/closing sequence may be preset such that the front door 110 may first be opened before or closed after opening or closing the rear door 120, due to overlapping interference of rotation trajectories of the front door 110 and the rear door 120 when opening and closing the front door 110 and the rear door 120.

Accordingly, because the opening/closing sequence of the front door 110 and the rear door 120 is preset, there is a problem in that the rear door 120 cannot be opened or closed alone.

FIG. 3 is a side view of a vehicle applied with opposing swing doors according to another example of the related art, and FIG. 4 is a cross-sectional view exemplarily illustrating a portion in which a front door and a rear door meet each other in the vehicle of FIG. 3.

Referring to FIG. 3 and FIG. 4, an example of opposing swing doors applied to a vehicle 200 with a B-pillar 230 is illustrated. In the instant case also, a front door 210 has a hinge portion installed at the front end portion of the front door 2110, and a rear door 220 has a hinge portion installed at the rear end portion of the rear door 220.

In the present opposing swing doors, a latch portion LC for maintaining a locked state is installed between the B pillar 230 and each side of the front door 210 and the rear door 220.

Furthermore, a sealing S for airtightness is installed between the B-pillar 230 and the rear end portion of the front door 210 and the front end portion of the rear door 220 corresponding to the B-pillar 230.

Accordingly, in the opposing swing doors of the vehicle 100 with a B-pillar, it is advantageous that the front door 210 and the rear door 220 are configured to be independently opened and closed, and thus the operation sequence is not limited. However, the open feeling deteriorates when the passengers get on/off or in leisure activities, due to the application of the B-pillar 230.

Accordingly, depending on the presence or absence of the B-pillar, the opposing swing doors have a difference in open feeling, and a difference in opening and closing operations of the front door and the rear door.

Meanwhile, as described above, to solve the problem of the limited operation sequence of the front door 110 and the rear door 120 while maintaining the open feeling of the vehicle 100 without the B-pillar, there is an example of the related art that employs a gooseneck-type hinge device as a door hinge device of the opposing swing doors. However, such a gooseneck-type hinge device requires a lot of free space in the vehicle body width direction due to the characteristic of its shape such that it is difficult to efficiently configure the vehicle body layout.

Accordingly, to apply the opposing swing doors to a vehicle without including a B-pillar, a door hinge device for implementing a new opening/closing structure is advantageous.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle door hinge device, in a vehicle without including a B-pillar, enabling door opening and closing operation in a state including secured a rotation trajectory of a door as a slide case sliding in an interior of a main case and a sliding arm sliding in an interior of the slide case move to the outside of the vehicle body diagonal direction by first and second screws driven by a single motor in the interior of the main case.

A vehicle door hinge device may include a case set diagonally provided toward an outside of a vehicle body at a location of the vehicle body corresponding to an end portion of a door, and including a slide case slidable with respect to a main case, a sliding arm provided on the slide case, and pivotally connected to a door hinge bracket fixed to the end portion of the door in an outside of the slide case, and a driving unit including first and second screws that are motor-driven and disposed in an interior of the main case in a longitudinal direction of the main case to be coupled to the slide case and the sliding arm, respectively, and configured to simultaneously slide the slide case and the sliding arm with respect to the main case.

The end portion of the door may be a frontal end portion of a front door or a rear end portion of a rear door.

The main case may include a cover on which a motor of the driving unit is fixed and to which end portions of the first and second screws are rotatably coupled, and the slide case may be disposed to be slidable with respect to the interior of the main case, and includes upper and lower guide slots in an upper portion and a lower portion on an external surface of the slide case to guide sliding movement of the sliding arm in the longitudinal direction thereof.

The sliding arm may include an upper arm disposed in the outside of the slide case and configured to slide along the upper guide slot by an upper slider, a lower arm disposed in the outside of the slide case and configured to slide along the lower guide slot by a lower slider engaged in the lower guide slot, and a connection plate that connects the upper and lower sliders in an interior of the slide case.

The door hinge bracket may be fixed to the end portion of the door, and hinged to frontal end portions of the upper arm and the lower arm through the hinge shaft.

The driving unit may include a motor provided on a cover fixed to an internal side of the main case, a motor gear connected on a motor shaft of the motor to output a torque of the motor, a first screw disposed in the interior of the main case, including an end portion rotatably provided on the cover through a bearing, engaged with a first screw housing formed on the slide case, and configured to rotate in a decreased speed by receiving the torque of the motor through a first drive gear engaged with the motor gear, and a second screw disposed in the interior of the main case, including an end portion rotatably provided on the cover through a bearing, engaged with a second screw housing formed on the sliding arm, and configured to rotate in an increased speed by receiving the torque of the motor through a second drive gear engaged with the motor gear.

The first drive gear may be fixed to the first screw; and the second drive gear is fixed to the second screw.

The first drive gear may include a diameter formed greater than that of the motor gear, and the second drive gear may include a diameter formed smaller than a diameter of the motor gear.

According to a vehicle door hinge device according to an exemplary embodiment of the present disclosure, the sliding arm connected to the hinge portion of the door slides from the main case to the outside of the vehicle body in the diagonal direction together with the slide case by the driving torque of the motor to secure the rotation trajectory of the door in advance, and therefore, both side doors, i.e., front and rear doors may be opened or closed independently and/or simultaneously.

Furthermore, after the hinge portion HG of the door DR automatically slides in the diagonal direction to the outside of the vehicle body BD along the sliding arm 20 by the driving torque of the motor M, the slid position of the sliding arm 20 may be maintained to be fixed by controlling the motor M, and accordingly, the door opening and closing operation may be performed stably.

Therefore, according to an exemplary embodiment of the present disclosure, in opposing swing doors of a vehicle without including a B-pillar, while maintaining the merit of good open feeling when the passengers get on/off or in leisure activities, the door opening and closing sequence is not limited.

Furthermore, a door hinge device of a vehicle according to an exemplary embodiment of the present disclosure is slimmer than a conventional gooseneck-type hinge device, and also includes an advantage in vehicle body layout configuration because it does not require an extra free space for the door operation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
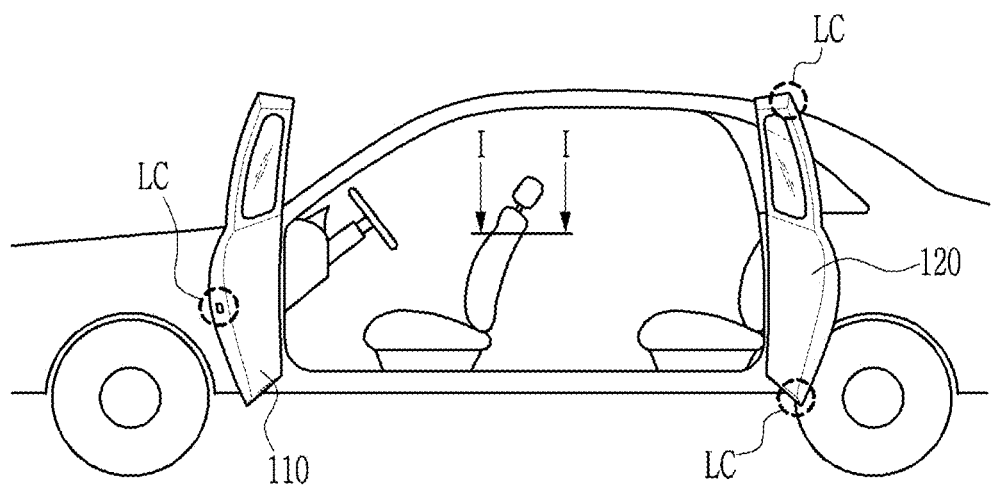
FIG. 1 is a side view of a vehicle applied with opposing swing doors according to an example of the related art.
Figure 2:
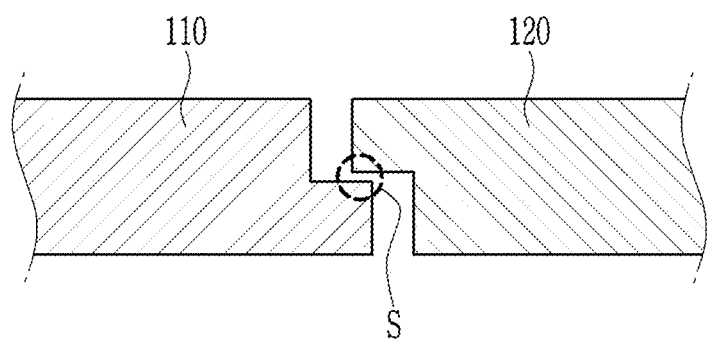
FIG. 2 is a cross-sectional view taken along line I-I of FIG. 1, showing a portion in which a front door and a rear door meet each other in the vehicle of FIG. 1.
Figure 3:
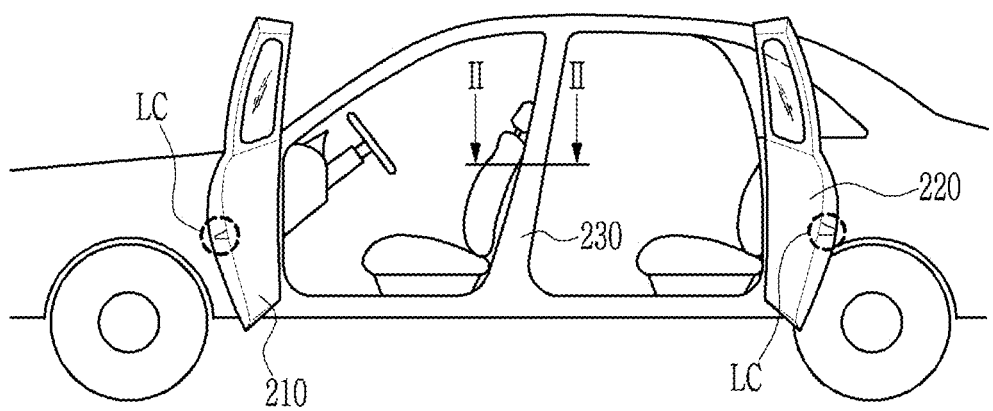
FIG. 3 is a side view showing a vehicle applied with opposing swing doors according to another example of the related art.
Figure 4:
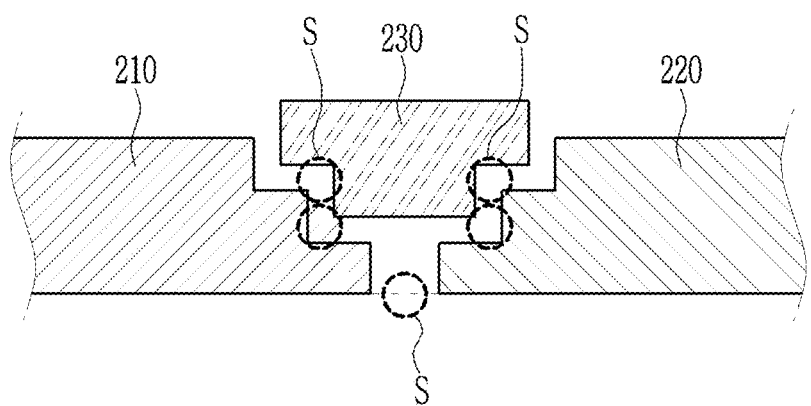
FIG. 4 is a cross-sectional view taken along line II-II of FIG. 3, showing a portion in which a front door and a rear door meet each other in the vehicle of FIG. 3.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment will be described in detail with reference to the accompanying drawings.

The size and thickness of each element are arbitrarily shown in the drawings, but the present disclosure is not necessarily limited thereto, and in the drawings, the thickness of layers, films, panels, regions, etc., are exaggerated for clarity. Furthermore, the drawings and description are to be regarded as illustrative in nature and not restrictive.

Figure 5:
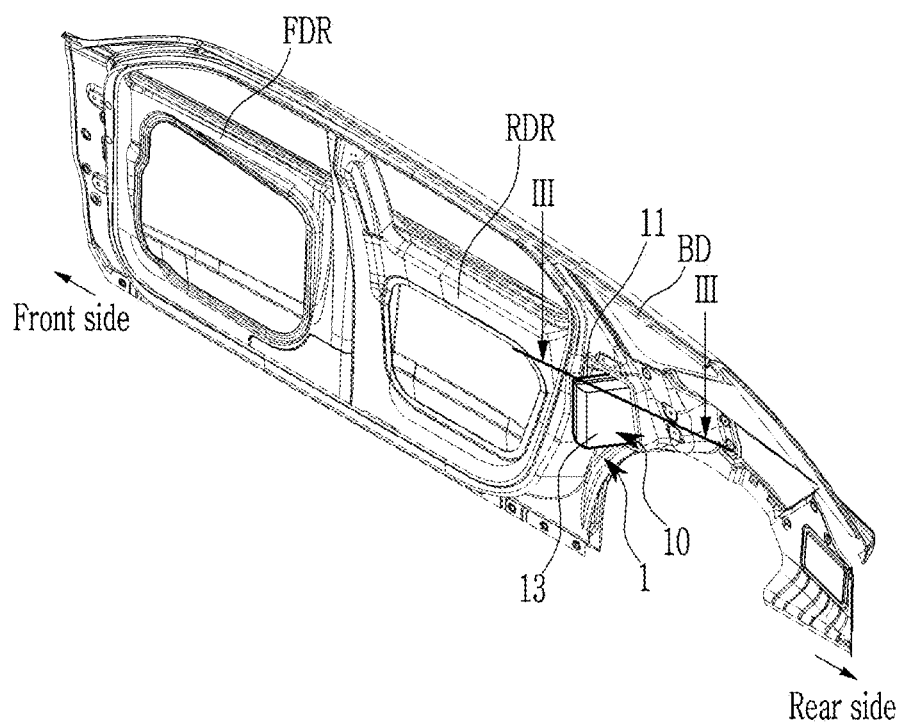
FIG. 5 is an internal perspective view of a vehicle door to which a vehicle door hinge device according to an exemplary embodiment of the present disclosure is applied.

In describing an exemplary embodiment of the present disclosure, for convenience of explanation, the upper left direction in FIG. 5 is defined as a front side, and the lower right direction is defined as a rear side thereof. Furthermore, a vehicle door hinge device according to an exemplary embodiment will be described taking an example applied to a rear door behind a passenger seat.

FIG. 5 is an internal perspective view of a vehicle door to which a vehicle door hinge device according to an exemplary embodiment of the present disclosure is applied.

Figure 6:
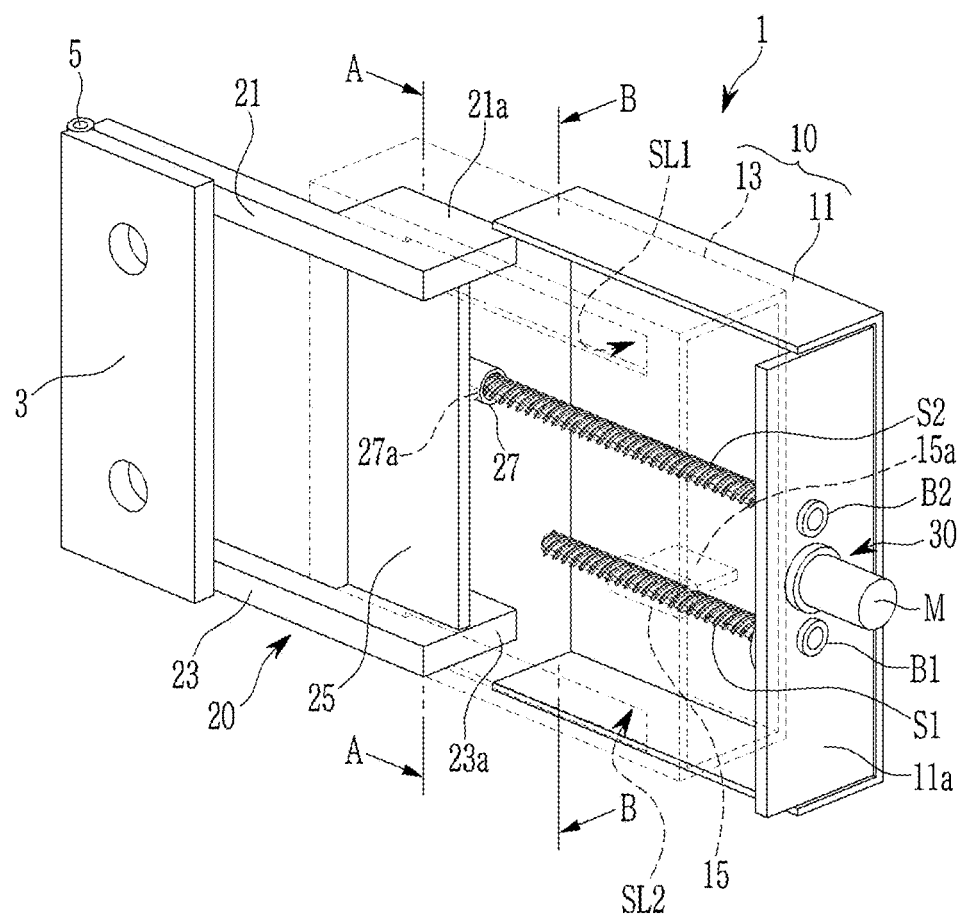
FIG. 6 is a perspective view of a slide case of a vehicle door hinge device according to an exemplary embodiment of the present disclosure.
Figure 7:
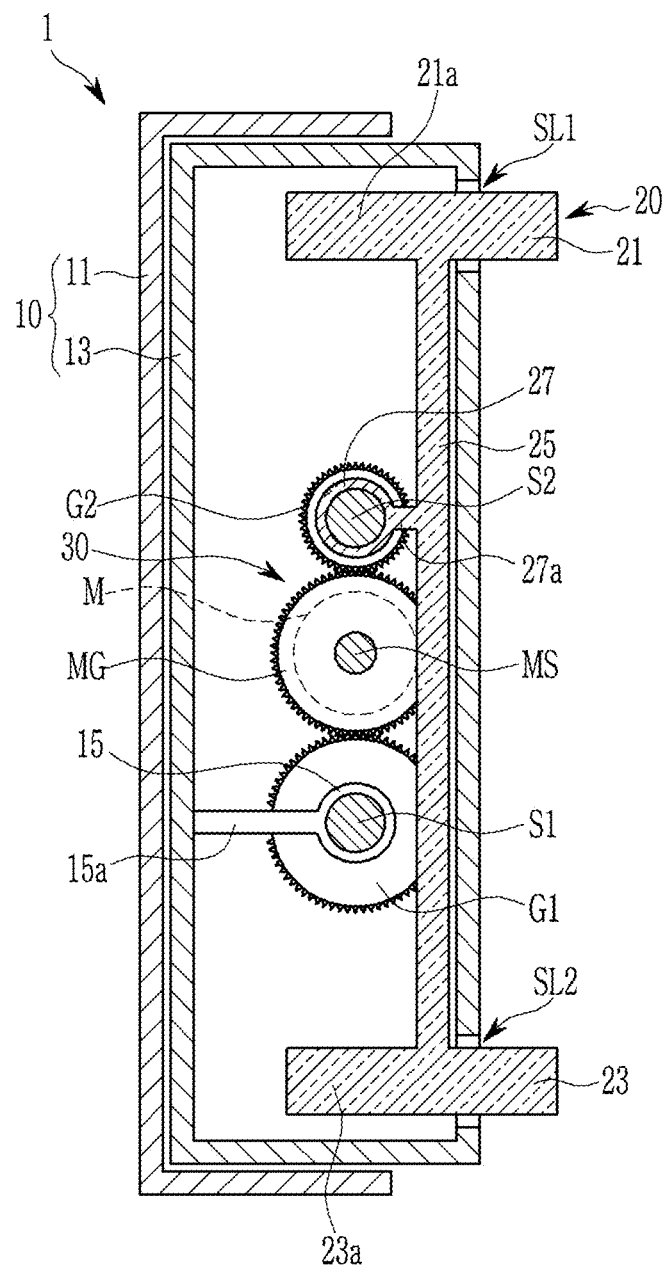
FIG. 7 is a cross-sectional view taken along line A-A of FIG. 6.
Figure 8:
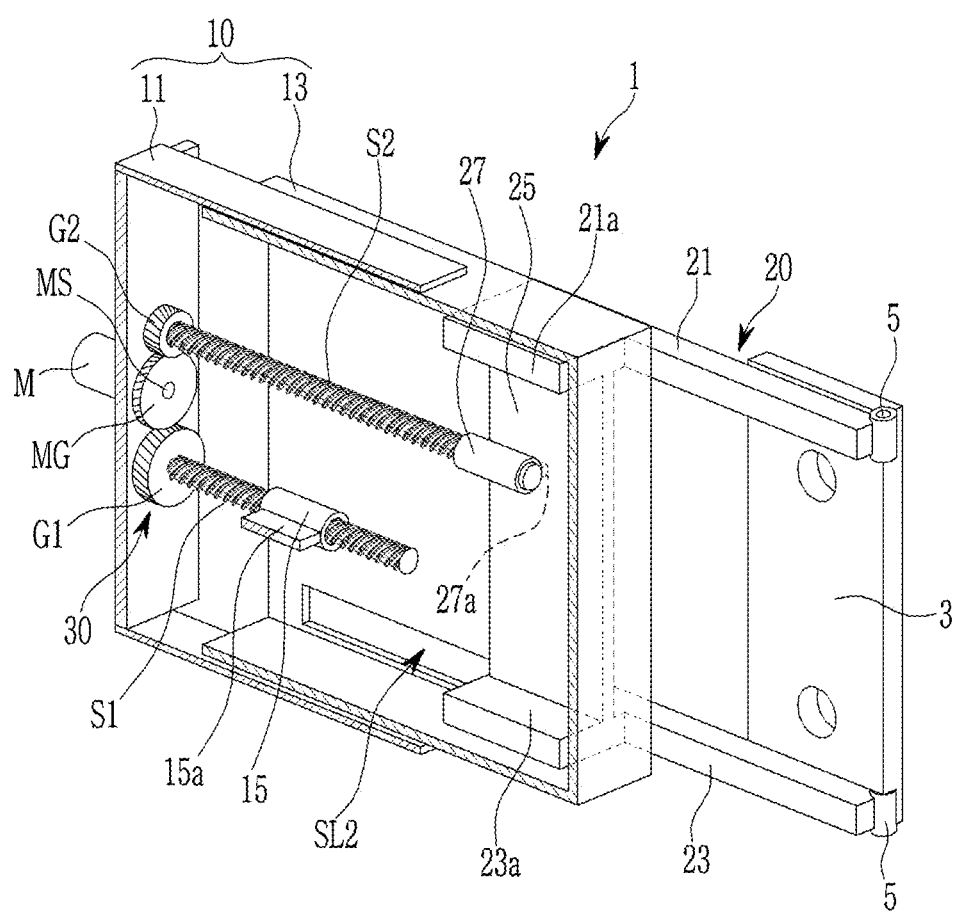
FIG. 8 is a cross-section perspective view taken along line B-B of FIG. 6.

FIG. 6 is a perspective view of a slide case of a vehicle door hinge device according to an exemplary embodiment of the present disclosure. FIG. 7 is a cross-sectional view taken along line A-A of FIG. 6. FIG. 8 is a cross-section perspective view taken along line B-B of FIG. 6.

The vehicle door hinge device 1 according to the exemplary embodiment of the present disclosure will be described taking an example applied to a rear door behind the passenger seat of a passenger vehicle without a B-pillar, but is not limited thereto, and it may also be applied between the vehicle body BD and both front doors FDR of a passenger vehicle without a B-pillar, and between the vehicle body BD and both rear doors RDR.

That is, when the door is opened and closed, in a state that rotation trajectories of respective doors are secured as a front door FDR or a rear door RDR moves to the front outside or the rear outside of the vehicle body BD in diagonal directions, both side doors may be simultaneously opened and closed, or the individual door may be opened or closed independently.

Referring to FIG. 5, FIG. 6, FIG. 7, and FIG. 8, a vehicle door hinge device 1 according to various exemplary embodiments of the present disclosure may include a case set 10 including a main case 11 and a slide case 13, a sliding arm 20, and a driving unit 30 that converts a torque of a motor M to a liner power.

An end portion of the case set 10 is provided toward an outside of the vehicle body in the diagonal direction at a first side of the vehicle body BD corresponding to an end portion of a door DR.

Here, the door DR may be the front door FDR or the rear door RDR, and may also indicate both. That is, in the case of the front door FDR, the end portion may be a frontal end portion of the front door FDR, and in the case of the rear door RDR, the end portion may be a rear end portion of the rear door RDR.

Furthermore, the first side of the vehicle body BD on which the front door FDR is provided means a front side of the vehicle body BD, and at the instant time, the case set 10 may be diagonally provided toward an outside of the front side of the vehicle body BD on which the front door FDR is provided.

Furthermore, the first side of the vehicle body BD on which the rear door RDR is provided means a rear side of the vehicle body BD, and at the instant time, the case set 10 may be diagonally provided toward an outside of the rear side of the vehicle body BD on which the rear door RDR is provided.

The case set 10 includes the main case 11 and the slide case 13, and the slide case 13 is assembled to be slidable in an interior of the main case 11.

Here, the main case 11 faces an internal side of the vehicle body BD, and the slide case 13 faces the outside of the vehicle body BD.

The slide case 13 is formed with an upper guide slot SL1 and a lower guide slot SL2 that are in parallel in an upper portion and a lower portion on an external surface of the slide case to guide sliding movement of the sliding arm 20 in the longitudinal direction thereof.

Furthermore, the sliding arm 20 is provided on the slide case 13, and the driving unit 30 is provided on a cover 11a fixed to an internal side of the main case 11.

That is, the main case 11 is formed in a "C" shape with an open external surface, and a cover 11a is bonded and fixed to an internal side thereof.

Furthermore, the slide case 13 is formed in the shape of a square beam with the front end portion blocked, and is provided to be slidable through the open portion of the main case 11.

Although not shown in the drawings in an exemplary embodiment of the present disclosure, a rail or the like may be provided between the main case 11 and the slide case 13 in a sliding direction thereof.

The sliding arm 20 is provided to be slidable along upper and lower guide slots SL1 and SL2 formed in the slide case 13, and connected to a door hinge bracket 3 fixed to an end portion of the door DR in an outside of the slide case 13 through a hinge shaft 5.

That is, the sliding arm 20 includes an upper arm 21, a lower arm 23, and a connection plate 25.

The upper arm 21 is disposed in an external upper portion of the slide case 13, and configured to slide along the upper guide slot SL1 by an upper slider 21a.

The lower arm 23 is disposed in an external lower portion of the slide case 13, and configured to slide along the lower guide slot SL2 by a lower slider engaged in the lower guide slot 23a.

Furthermore, the connection plate 25 connects the upper slider 21a and the lower slider 23a in an interior of the slide case 13, to enable the upper arm 21 and the lower arm 23 to integrally move.

Furthermore, in the outside of the slide case 13, frontal end portions of the upper arm 21 and the lower arm 23 are hinged to the door hinge bracket 3 through the hinge shaft 5, and the door hinge bracket 3 is fixed to the end portion of the door DR.

Furthermore, the driving unit 30 includes first and second screws S1 and S2 disposed in the interior of the main case 11 in the longitudinal direction of the main case 11 and engaged with the slide case 13 and the sliding arm 20 through the first and second screw housings 15 and 27, and is configured to simultaneously slide the slide case 13 and the sliding arm 20 with respect to the main case 11 at different speeds when the first and second screws S1 and S2 are rotated by operation of the motor M.

That is, the driving unit 30 includes the motor M, a motor gear MG, the first and second screws S1 and S2.

The motor M is provided in a center portion of an external surface on the cover 11a fixed to the internal side of the main case 11.

Here, the motor M may be a step motor of which a rotation speed and rotation direction may be controlled.

Furthermore, at an internal side of the cover 11a, the motor gear MG is fixed to a motor shaft MS of the motor M, to output a torque of the motor M.

The first screw S1 is disposed in the interior of the main case 11 along the longitudinal direction, and includes an end portion rotatably provided on the cover 11a through a bearing B1.

Furthermore, the first screw S1 is screw-engaged with a first screw housing 15 connected to the slide case 13 through a first bracket 15a.

Furthermore, a first drive gear G1 is fixed to the first screw S1 and the first drive gear G1 is engaged with the motor gear MG, to rotate in a decreased speed by receiving the torque of the motor M.

The second screw S2 is disposed in the interior of the main case 11 along the longitudinal direction, and includes an end portion rotatably provided on the cover 11a through a bearing B2.

Furthermore, the second screw S2 is screw-engaged with a second screw housing 27 connected to the connection plate 25 of the sliding arm 20 through a second bracket 27a.

Furthermore, a second drive gear G2 is fixed to the second screw S2 and the second drive gear G2 is engaged with the motor gear MG, to rotate in an increased speed by receiving the torque of the motor M.

Here, a ball screw structure forming rolling contact through a plurality of balls may be formed between the first screw S1 and the first screw housing 15 and between the second screw S2 and the second screw housing 27.

Furthermore, the first screw S1 and second screw S2 are disposed in upper and lower portions with reference to the motor gear MG, to receive the torque of the motor M to rotate at a decreased speed and an increased speed, respectively so that a sliding speed of the sliding arm may be faster than that of the slide case.

That is, the first drive gear G1 includes a diameter formed greater than that of the motor gear MG to form the decreased speed from the rotation speed of the first screw S1, and the second drive gear G2 includes a diameter formed smaller than a diameter of the motor gear MG to form the increased speed from the rotation speed of the second screw S2.

Here, although the speed decrease ratio of the first drive gear G1 and the speed increase ratio of the second drive gear G2 with respect to the motor gear MG may be changed according to design constraints, they may be set in consideration of moving distances of the slide case 13 and the sliding arm 20 with respect to the main case 11 so that a sliding movement of the sliding arm 20 with respect to the slide case 13 may be finished at a time point at which a out-sliding movement of the slide case 13 with respect to the main case 11 is finished.

Figure 9:
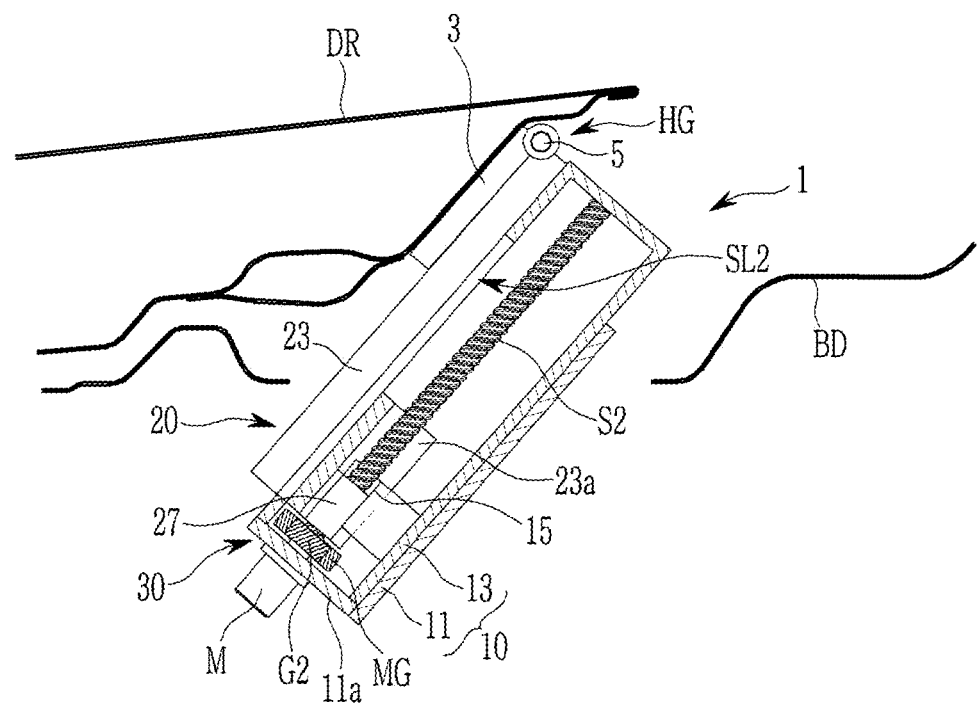
FIG. 9, FIG. 10 and FIG. 11 are planar cross-sectional views taken along line III-III of FIG. 5, exemplarily illustrating step-by-step operating states of a vehicle door hinge device according to an exemplary embodiment of the present disclosure.
Figure 10:
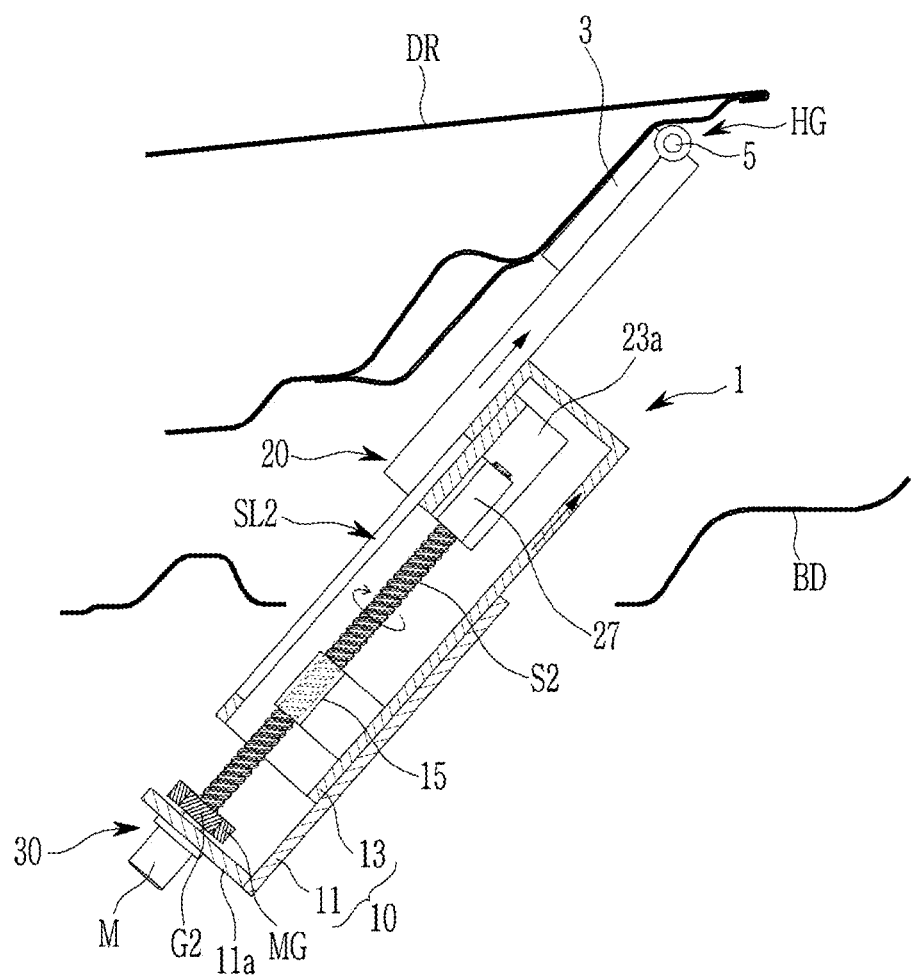
Figure 11:
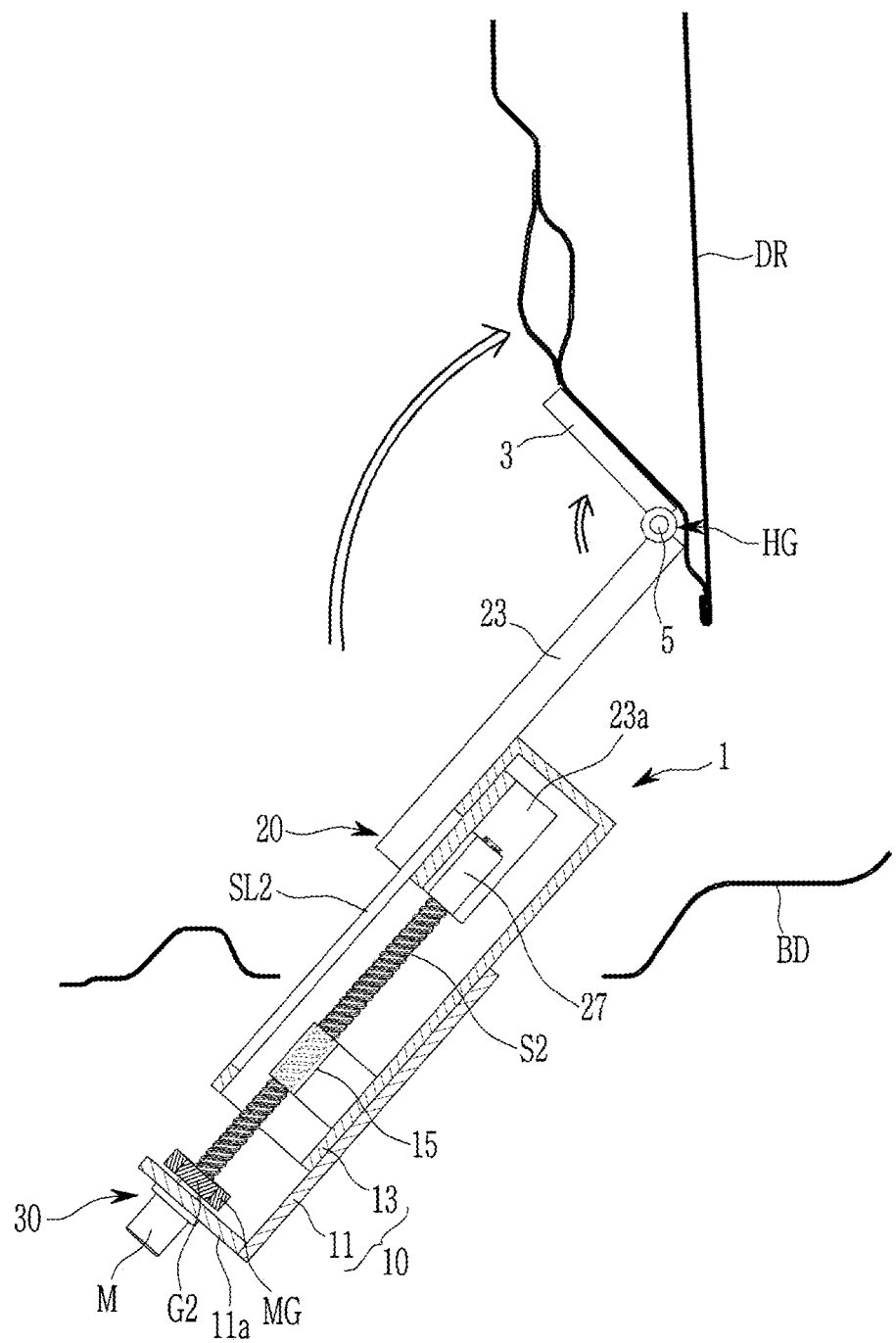

FIG. 9, FIG. 10 and FIG. 11 are planar cross-sectional views exemplarily illustrating step-by-step operating states of a vehicle door hinge device according to an exemplary embodiment of the present disclosure.

Hereinafter, an operation of a door hinge device of a vehicle according to an exemplary embodiment of the present disclosure is described in detail with reference to FIG. 9, FIG. 10 and FIG. 11.

First, referring to FIG. 9, the door DR is in a closed state.

At the present time, the hinge shaft 5 connecting the door DR and the vehicle body BD is in a state of including diagonally moved together with the sliding arm 20 within the vehicle body BD, the end portion of the door DR is in a position that maintains the door DR in the closed state.

Referring to FIG. 10, to open the door DR in the closed state, the motor M is driven to rotate the first and second screws S1 and S2. Accordingly, the slide case 13 and the sliding arm 20 connected to the first and second screws S1 and S2 through the first and second screw housings 15 and 27 move in the diagonal direction to the outside of the vehicle body BD along the first and second screws S1 and S2.

Accordingly, the door hinge bracket 3 hinged to a frontal end portion of the sliding arm 20 through the hinge shaft 5 is moved in the diagonal direction to the outside of the vehicle body BD.

Accordingly, a hinge portion HG of the door DR connected to the vehicle body BD moves in the diagonal direction to the outside of the vehicle body BD, and thereby a rotation trajectory of the door DR may be secured without an interference with the vehicle body BD or another door DR.

Referring to FIG. 11, when the door DR is opened at a state that the rotation trajectory of the door DR is secured, the door DR may be opened around the hinge shaft 5 without an interference.

Meanwhile, the operation of closing the door DR may be opposite to the operation of opening the door DR described above, and is not described here in further detail.

Therefore, according to a vehicle door hinge device 1 according to an exemplary embodiment of the present disclosure, the sliding arm 20 connected to the hinge portion HG of the door DR slides from the main case 11 to the outside of the vehicle body BD in the diagonal direction together with the slide case 13 by the driving torque of the motor M to secure the rotation trajectory of the door DR in advance, and therefore, both side doors, i.e., front and rear doors may be opened or closed independently and/or simultaneously.

Furthermore, after the hinge portion HG of the door DR automatically slides in the diagonal direction to the outside of the vehicle body BD along the sliding arm 20 by the driving torque of the motor M, the slid position of the sliding arm 20 may be maintained to be fixed by controlling the motor M, and accordingly, the door opening and closing operation may be performed stably.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle door hinge apparatus, comprising:
    a case set diagonally provided toward an outside of a vehicle body at a location of the vehicle body corresponding to an end portion of a door, and including a main case and a slide case slidable with respect to the main case;
    a sliding arm provided on the slide case, wherein a first end portion of the sliding arm is pivotally connected to a door hinge bracket fixed to the end portion of the door in an outside of the slide case; and
    a driving unit including first and second screws that are motor-driven and disposed in an interior of the main case in a longitudinal direction of the main case to be coupled to the slide case and the sliding arm, respectively, and configured to simultaneously slide the slide case and the sliding arm with respect to the main case,
    wherein the main case includes a cover on which a motor of the driving unit is fixed and to which end portions of the first and second screws are rotatably coupled, and
    wherein the slide case is disposed to be slidable with respect to the interior of the main case, and includes a slot in an external surface of the slide case,
    wherein a second end portion of the sliding arm is slidably engaged to the slot to guide sliding movement of the sliding arm in a longitudinal direction of the slide case.

2. The door hinge apparatus of claim 1, wherein the door includes a front door or a rear door, and wherein the end portion of the door is a frontal end portion of the front door or a rear end portion of the rear door.

3. The door hinge apparatus of claim 1, wherein the slot includes an upper slot in an upper portion of the slide case and a lower guide slot in a lower portion of the slide case, and
    wherein the second end portion of the sliding arm is slidably engaged to the upper slot and the lower slot, to guide the sliding movement of the sliding arm in the longitudinal direction of the slide case.

4. The door hinge apparatus of claim 1, wherein the sliding arm is provided to be slidable along upper and lower guide slots formed in the slide case.

5. The door hinge apparatus of claim 4, wherein the sliding arm includes:
    an upper arm disposed in the outside of the slide case and configured to slide along the upper guide slot by an upper slider engaged in the upper guide slot;
    a lower arm disposed in the outside of the slide case and configured to slide along the lower guide slot by a lower slider engaged in the lower guide slot; and
    a connection plate that connects the upper and lower sliders in an interior of the slide case.

6. The door hinge apparatus of claim 4, wherein the door hinge bracket is fixed to the end portion of the door, and hinged to frontal end portions of an upper arm and a lower arm through a hinge shaft.

7. The door hinge apparatus of claim 1, wherein the driving unit is configured to slide the slide case and the sliding arm at different speeds with respect to the main case.

8. The door hinge apparatus of claim 1, wherein the slide case and the sliding arm are engaged on the first and second screws through first and second screw housings, respectively.

9. The door hinge apparatus of claim 8, wherein the slide case is engaged on the first screw through the first screw housing connected to the slide case through a first bracket.

10. The door hinge apparatus of claim 8, wherein the sliding arm is engaged on the second screw through the second screw housing connected to the sliding arm through a second bracket.

11. The door hinge apparatus of claim 1, wherein the driving unit includes:
    the motor provided on the cover fixed to an internal side of the main case;
    a motor gear connected on a motor shaft of the motor to output a torque of the motor;
    the first screw disposed in the interior of the main case, including an end portion rotatably provided on the cover, engaged with a first screw housing formed on the slide case, and configured to rotate in a decreased speed by receiving the torque of the motor through a first drive gear engaged with the motor gear; and
    the second screw disposed in the interior of the main case, including an end portion rotatably provided on the cover, engaged with a second screw housing formed on the sliding arm, and configured to rotate in an increased speed by receiving the torque of the motor through a second drive gear engaged with the motor gear.

12. The door hinge apparatus of claim 11,
    wherein the end portion of the first screw is rotatably provided on the cover through a first bearing, and
    wherein the end portion of the second screw is rotatably provided on the cover through a second bearing.

13. The door hinge apparatus of claim 11, wherein the first drive gear is fixed to the first screw, and the second drive gear is fixed to the second screw.

14. The door hinge apparatus of claim 11, wherein the first drive gear includes a diameter formed greater than a diameter of the motor gear, and the second drive gear includes a diameter formed smaller than a diameter of the motor gear.

15. A vehicle door hinge apparatus, comprising:

a case set provided toward an outside of a vehicle body at a location of the vehicle body corresponding to an end portion of a door, and including a main case and a slide case telescopically coupled to the main case;

a sliding arm provided on the slide case, wherein a first end portion of the sliding arm is pivotally connected to the end portion of the door; and a driving unit mounted on the main case and including:

a first actuator coupled to the slide case;

a second actuator coupled to the sliding arm; and a driving device engaged to the first actuator and the second actuator to synchronously operate the first actuator and the second actuator to simultaneously slide the slide case and the sliding arm with respect to the main case, wherein the first actuator includes:

a first screw, a first end portion of which is rotatably coupled to the main case and a second end portion of which is engaged to the slide case; and a first drive gear connected to the first screw, wherein the second actuator includes:

a second screw, a first end portion of which is rotatably coupled to the main case and a second end portion of which is engaged to the slide arm; and a second drive gear connected to the second screw, and wherein the driving device includes:

a motor; and a motor gear gear-engaged to the first drive gear and the second drive gear, wherein the first drive gear includes a diameter greater than a diameter of the motor gear, and the second drive gear includes a diameter smaller than a diameter of the motor gear.

16. The door hinge apparatus of claim 15, wherein the slide case is engaged on the first screw through a first screw housing connected to the slide case and wherein the sliding arm is engaged on the second screw through a second screw housing.

* * * * *